United States Patent Office 3,105,632
Patented Oct. 1, 1963

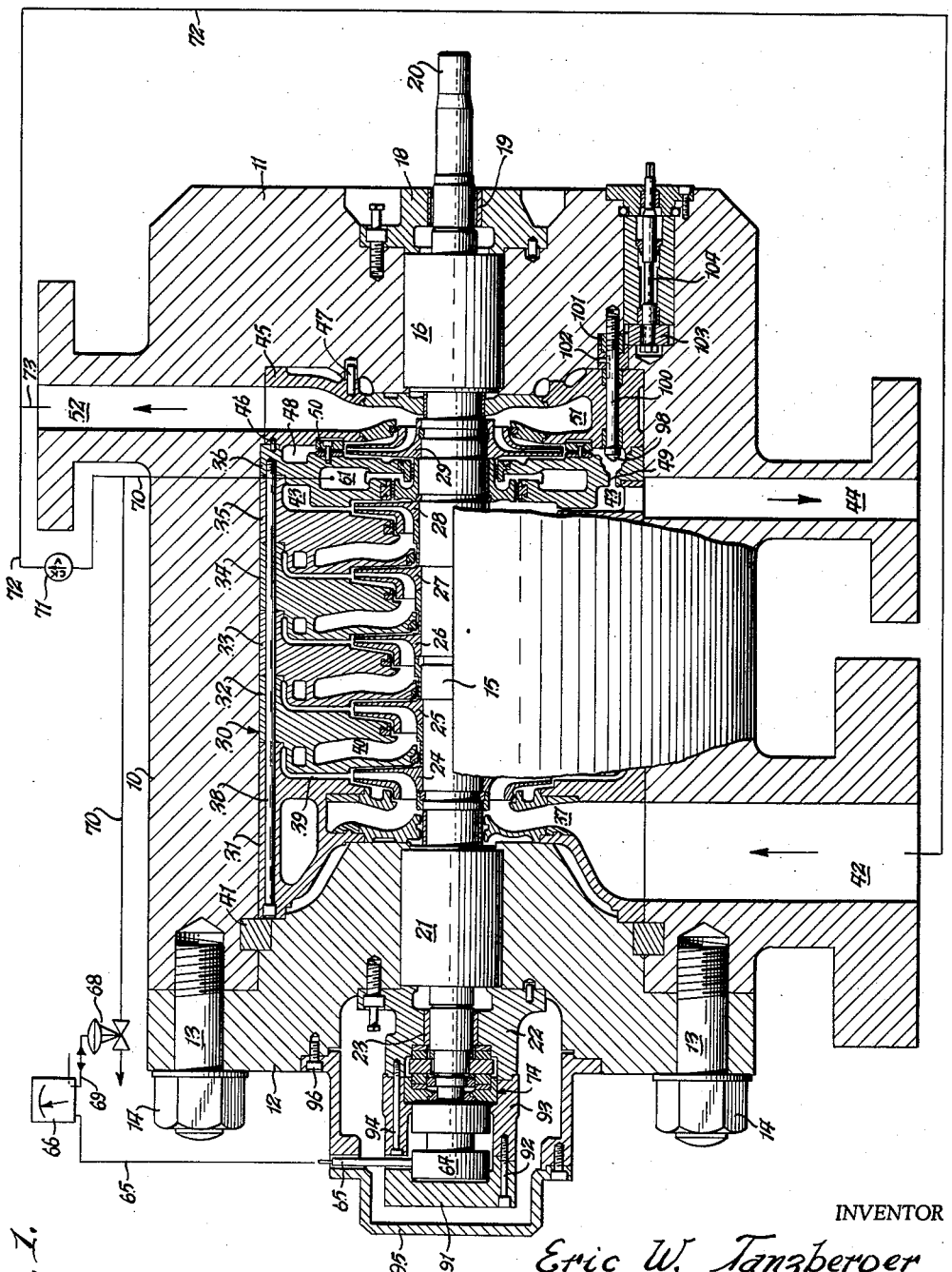
Fig. I

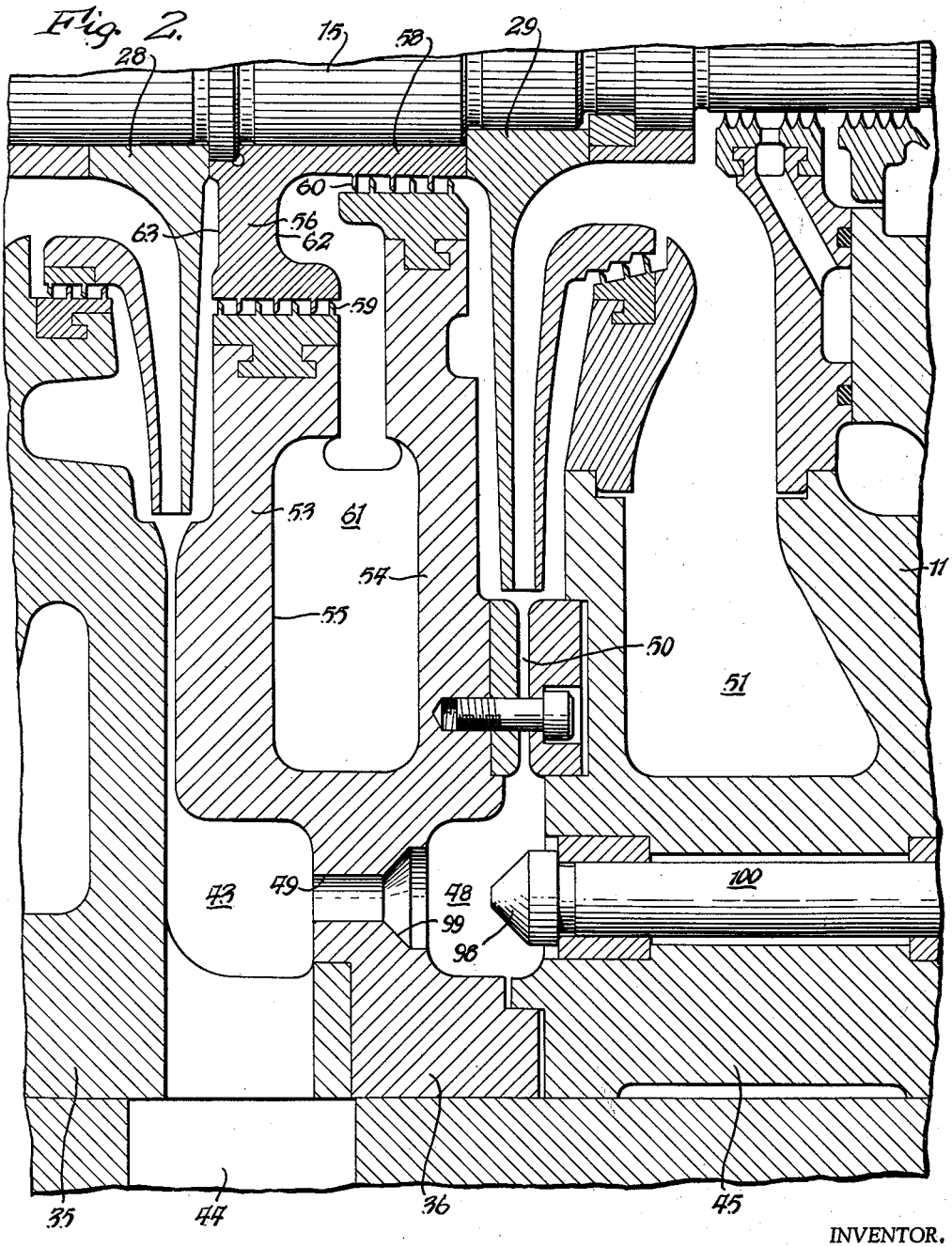

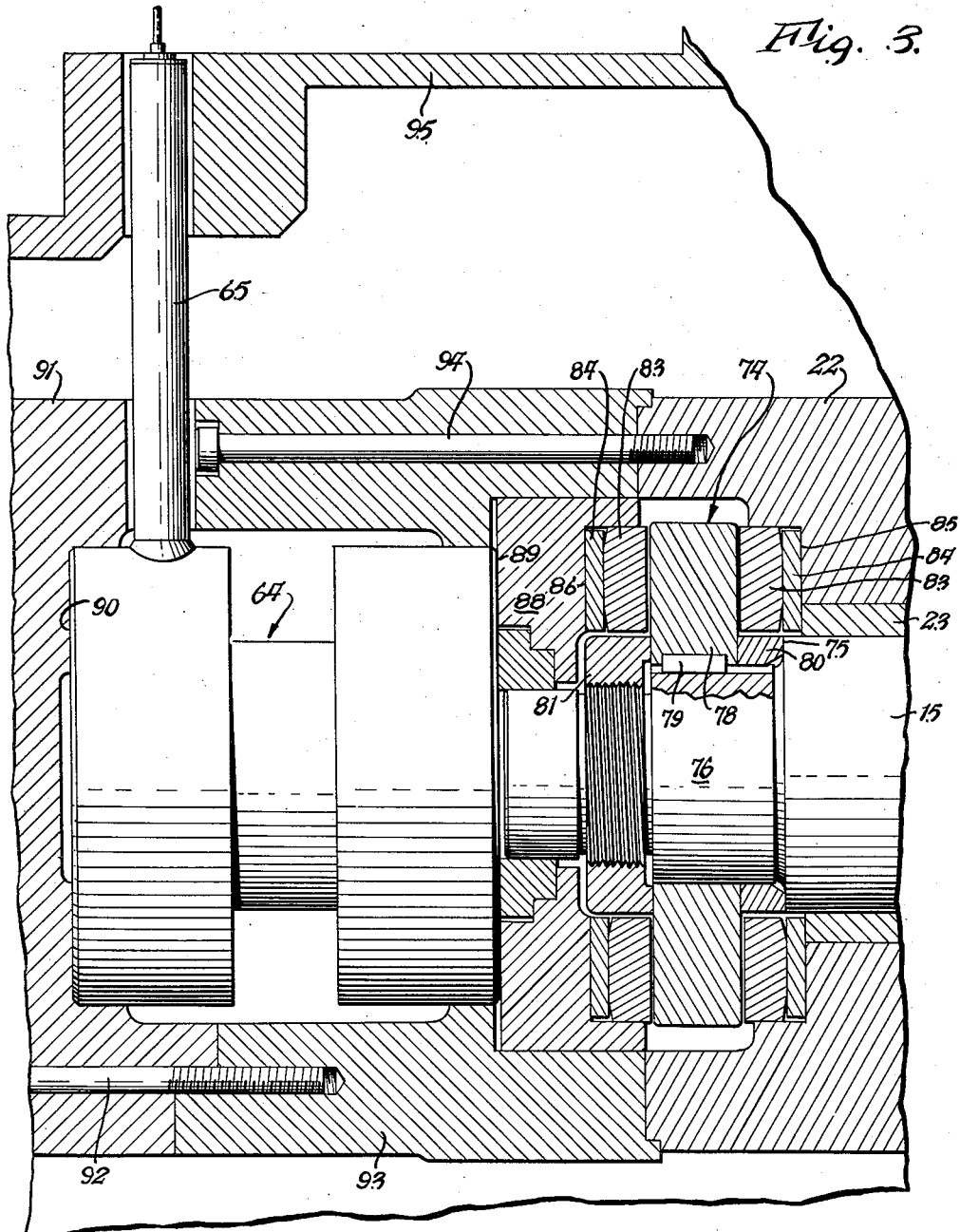

3,105,632
HIGH PRESSURE CENTRIFUGAL COMPRESSOR
Eric W. Tanzberger, Olean, N.Y., assignor, by mesne assignments, to Dresser Industries, Inc., Dallas, Tex., a corporation of Delaware
Filed Mar. 14, 1960, Ser. No. 14,795
6 Claims. (Cl. 230—130)

This invention relates to improvements in centrifugal compressors, and more particularly to a high pressure, relatively small volume, centrifugal compressor.

Small voume centrifugal compressors inherently have low hydraulic efficiency at commercially acceptable rotative speeds. This deficiency is overcome with the present invention by compressing more air than is needed for the process. Moreover, the compressor is kept stable and prevented from surging under variations in demand or process load. The fluid compressed in excess of that required for the process is utilized in a manner so as to recover a high percentage of the energy thereof. This is achieved by expanding the unneeded compressed fluid through a turbine wheel which is secured to the compressor shaft, thereby returning power to the shaft.

Accordingly, an object of the present invention is to provide a small volume centrifugal compressor which has high hydraulic efficiency.

Because of the relatively high pressures at which the compressor is operating, typically at a range from 2500 p.s.i. at the compressor inlet to 5,000 p.s.i. at the compressor outlet, the axial or end thrusts severally of the impellers and turbine wheel on the compressor shaft are substantial in value and it is desirable to make provision to compensate for the resultant axial thrust on the compressor shaft, even though the impellers and turbine wheel may be arranged back to back so as to essentially cancel out their respective thrusts. Under conditions of a variable load, the resultant axial thrust changes in value with a change in load. In accordance with the present invention, the resultant axial thrust is compensated for or substantially counterbalanced at all times. This is achieved by a balancing piston mechanism which substantially eliminates all resultant thrust on the compressor shaft and which involves the use of a variable compensating pressure working against a thrust balance piston.

It is, therefore, another object of the present invention to provide such a centrifugal compressor in which axial or end thrust on the compressor shaft is compensated for, even with a variable load on the compressor.

Still another object of the present invention is to so arrange the impellers and turbine wheel with respect to each other and with respect to the journal bearings and shaft seals that the seals and bearings operate in an atmosphere substantially the same and having the same ambient temperature. This is achieved by having the inlet to the first stage of the compressor arranged adjacent to one shaft seal and journal bearing and by causing the hot compressed fluid to expand radially inwardly through the turbine wheel which is arranged immediately adjacent to the other shaft seal and journal bearing. This expansion causes a drop in temperature and, therefore, acts as a coolant for the adjacent areas.

A further object of the present invention is to provide a centrifugal compressor for delivering air under high pressure, say at 5,000 p.s.i., and which is free from oil. For certain applications, such as wind tunnel work, this is an absolute requirement. Heretofore, air at such pressure was usually produced by a reciprocating piston type of compressor which, while readily producing the pressure, would not provide the compressed air uncontaminated with oil used to lubricate the reciprocating piston.

Other objects and advantages of the present invention will be apparent from the following detailed description of a preferred embodiment thereof and illustrated in the accompanying drawings in which:

FIG. 1 is a vertical central longitudinal sectional view through a centrifugal compressor embodying the present invention, with a portion of the compressor casing being shown in elevation.

FIG. 2 is a greatly enlarged fragmentary sectional view of a portion of the compressor shown in FIG. 1 adjacent the right hand end of the shaft and illustrating the thrust balance piston and by-pass and valve means therefor for controlling the connection between the outlet of the last stage impeller and the inlet of the power recovery turbine wheel.

FIG. 3 is a greatly enlarged fragmentary sectional view of the thrust bearing and end thrust sensing element shown at the left hand end of the shaft in FIG. 1.

Inasmuch as the type of centrifugal compressor with which the present invention is concerned deals with relatively high pressure, it is preferred to provide a one-piece cylindrical or barrel type outer casing 10 which is shown as having an inwardly dished integral end head 11 at one end and a removable end head 12 at its opposite end. The removable end head 12 is secured to the end of the cylindrical wall of the casing 10 by a series of circumferentially spaced, axially extending studs 13 which extend through holes provided in the end head 12 and carry nuts 14 on their outer ends. Such a barrel type outer casing 10 is also known by those skilled in the art as a vertically split case which is one divided in a plane extending at right angles to the axis of the compressor, at least at one end thereof.

A shaft 15 is shown as extending horizontally and coaxially through the outer casing 10 and the end heads 11 and 12 thereof. Thus, one end of the shaft 15 extends through a suitable type shaft seal 16 of conventional construction arranged in a bore provided in the integral end head 11. A bearing housing 18 holds the seal assembly 16 in position and at the same time provides a support for a sleeve type bearing 19 in which the shaft 15 is journalled. The bearing 19 is arranged axially outwardly of the seal assembly 16. The outer end of the shaft 20 is adapted for coupling to any suitable rotating prime mover (not shown).

At the other end, the shaft 15 is surrounded by a seal assembly 21, similar to the assembly 16. The seal assembly 21 is arranged in a hole provided centrally in the removable end head 12 and is held in such hole by a bearing housing 22. This housing supports a sleeve bearing 23 on which the shaft 15 is journalled.

Disposed between the seal assemblies 16 and 21 are a plurality of impellers arranged end to end and suitably made fast to the shaft 15 so as to rotate therewith. Five such impellers are shown and are indicated individually at 24, 25, 26, 27 and 28. This provides five stages of compression although any other number of stages may be employed. Intermediate the last stage impeller 28 and seal assembly 16 is a radially inward flow type turbine wheel 29 which is suitably made fast to the shaft 15 so as to rotate therewith.

Surrounding the various impellers 24—28 and turbine wheel 29 is an inner case indicated generally at 30. This inner case comprises a plurality of annular elements known in this art as diaphragms, six such being shown and designated individually 31, 32, 33, 34, 35 and 36. These diaphragms are shown as being connected together by axially extending tie bolts, one being indicated typically at 38, to provide the unit 30. The various diaphragms 31—36 are formed so that adjacent pairs of the same jointly provide the usual diffuser passage for each impeller, one such passage being typically shown at 39. The diaphragms are also internally formed to connect the diffuser passage for one impeller to the inlet 40 of the next succeeding impeller. The usual labryinth seals are provided between the opposing portions of the diaphragms 31—36 and the shaft 15 and impellers 24—28.

The inner case 30 fits within the outer casing 10 and is held therein by a retainer ring 41 backed up by the end head 12. The first diaphragm 31 is formed to provide a volute passage 37 leading from an inlet 42 for the compressor arranged on the outer casing 10 to the inlet of the first stage impeller 24. The diffuser passage formed between the last two diaphragms 35 and 36 is shown as communicating with a volute chamber 43 which leads to the compressor outlet 44 formed on the outer casing 10.

Another member 45 which may be termed a diaphragm is arranged adjacent the outer end of the diaphragm 36, being suitably secured thereto to prevent relative rotative movement as by dowel pins one of which is shown typically at 46. The diaphragm 36 is also shown as rendered non-rotative with respect to the outer casing as by dowel pins, one of which is shown typically at 47. The diaphragms 36 and 45 are formed to provide therebetween an annular turbine inlet chamber 48. This annular turbine inlet chamber 48 communicates with the compressor outlet chamber 43 via a by-pass channel 49 arranged in the diaphragm 36. Between the periphery of the turbine wheel 29 and the annular inlet chamber 48 is an annular turbine nozzle 50. The turbine diaphragm 45 is shown as formed to provide a volute outlet chamber 51 communicating with the outlet or inner end of the turbine wheel 29 and the expander discharge 52 formed on the outer casing 10.

The various impellers 24—28 are shown as being similarly arranged on the shaft 15 and produce an axial or end thrust on the shaft directed to the left as viewed in FIG. 1 or toward the suction end of the compressor. The turbine wheel 29 is arranged on the shaft 15 in back-to-back fashion with respect to the impellers so that the axial or end thrust exerted upon the shaft 15 by the turbine wheel 29 acts to the right as viewed in FIG. 1 or toward the discharge end of the compressor. The values of these oppositely acting end thrusts vary in amount with variations in the load on the compressor.

By way of a more detailed explanation of the direction of thrust exerted by the impellers 24—28 and the turbine wheel 29, it will be observed that each of the impellers and the turbine wheel is shown as having a pair of spaced plates, severally circular in outline from an axial viewpoint, including a disc which extends radially outwardly from the shaft 15 and a cover which adjacent its center is turned axially. Thus, an annular opening facing in an axial direction is provided adjacent the shaft, this being an inlet facing left for each of the impellers 24—28 and an outlet facing right for the turbine wheel 29. Also, a circumferential opening at the radially outer ends of the spaced impeller plates provides an outlet in the case of each of the impellers 24—28 and an inlet in the case of the turbine wheel 29.

Considering the first stage impeller 24, for example, it will be seen that gas being handled by the compressor flows from the inlet 37 at a given pressure into the leftward axially facing annular inlet of the impeller 24, is turned internally within the impeller from an axial to a radial direction to be discharged through the circumferential outlet of the impeller into the diffuser passage 39 which leads to the inlet 40 for the second stage impeller 25. In flowing through the internal passageway of the impeller 24, the gas is compressed by centrifugal action. Thus, a pressure differential exists between the inlet and outlet of the impeller 24. The impeller moves relative to stationary parts and clearances exist therebetween as illustrated in the drawings. Since the higher outlet pressure is effective against a greater area on the downstream side of the impeller 24 than on the upstream side thereof, i.e. the axial force acting leftward against the right side of the disc is greater than the axial force acting rightward against the left side of the cover, it will be seen that a thrust is exerted by the impeller 24 upon the shaft 15 to the left as viewed in FIG. 1 or toward the suction end of the compressor.

Similar analysis of each of the other stage impellers 25—28 will show that the same thing happens there, except for specifically different pressure differentials existing across the various impellers. The cumulative effect of the thrusts of the impellers 24—28 is all in the same direction, namely, to the left as viewed in FIG. 1 or toward the suction end of the compressor.

On the other hand, the turbine wheel 29 is arranged on the shaft 15 in reversed relationship to the impellers 24—28 so that although a pressure differential exists between the radially outer circumferential margin of the turbine wheel 29 and its radially inner end or hub portion immediately surrounding the shaft, the higher pressure is effective over a larger area on the left side of the turbine wheel 29. This urges the turbine wheel to the right as viewed in FIG. 1. Since the impellers and turbine wheel are locked to the shaft, the thrusts produced thereby upon the shaft are algebraically summed so that a resultant thrust is left. Inasmuch as there are more impellers than turbine wheels and keeping in mind that the pressure upon the turbine wheel 29 is no higher than that of the gas leaving the last stage impeller 28, it is evident that the cumulative leftward thrust effect of the impellers 24—28 will always dominate the oppositely directed or rightward thrust produced by the turbine wheels 29. This leaves a resultant end thrust exerted upon the shaft 15 to the left as viewed in FIG. 1 or toward the suction end of the compressor.

It is an important feature of the present invention to provide end thrust compensating means for counterbalancing the aforesaid leftward resultant thrust produced by the impellers 24—28 and turbine wheel 29. For this purpose, the diaphragm 36 is shown as provided with spaced walls 53 and 54 to provide therebetween a recess 55, as best shown in FIG. 2. The inner circular ends of these walls 53 and 54 surround a thrust balance piston 56 fast to the shaft 15 and arranged thereon intermediate the last stage impeller 28 and turbine wheel 29. The piston 56 is shown as having a hub portion 58 embracing the shaft 15 and projecting toward the turbine wheel 29. A labyrinth seal is interposed between the opposing faces of the stationary wall 53 and the enlarged part of the rotating piston 56, as indicated at 59. A labyrinth seal is interposed between the opposing faces of the hub portion 58 of the rotating piston 56 and the stationary wall 54, as indicated at 60.

It will thus be seen that the spaced walls 53 and 54 of the diaphragm 36 and the piston 56 jointly provide a balancing chamber 61 into which fluid being handled by the compressor can collect as a result of leakage through the labyrinth seals 59 and 60. The pressure of the fluid collected within the chamber 61 is effective against one axially facing side 62 of the radially enlarged portion of the piston 56, specifically that side which faces the turbine wheel 29. The opposite axially facing side 63 of the piston 56, or that side which faces the last stage impeller 28, is subjected to the pressure associated with the last stage impeller which is usually higher than that obtaining within the chamber 61.

Means are provided for sensing the axial or end thrust of the shaft 15 and for controlling the presure of fluid within the chamber 61 in response to such axial or end thrust. For this purpose, a thrust sensing element 64 is arranged at one end of the shaft 15. The sensing element 64 may be a flexible container filled with mercury, shown at left end of this shaft as viewed in FIG. 1. The interior of the element 64 communicates via the duct or line 65 with a conventional indicating and controlling instrument 66. The instrument 66 indicates the magnitude of end thrust sensed by the element 64 and also controls air flow to or from the diaphragm of a diaphragm operated control valve 68. Air for controlling the diaphragm of the valve 68 is handled through the duct or line 69 and is derived from any suitable source (not shown). The valve 68 is arranged in a duct or line 70 leading to the balancing chamber 61, as shown in FIG. 1. A check valve 71 is shown as arranged in a return line 72 connected at one end to the line 70 and at its other end to the inlet 42 for the compressor. The expander discharge 52 is shown as connected also to the compressor inlet 42. For this latter purpose, expander discharge 52 is shown as connected to the return line 72 via the branch duct or line 73.

Arranged between the sensing element 64 and the journal bearing 23 is a thrust bearing indicated generally at 74 which is adapted to take the axial or end thrust of the shaft 15 in either axial direction. The construction of the thrust bearing 74 can best be understood by referring to FIG. 3. The shaft 15 is shown as having an axial facing shoulder 75 at one end of a reduced cylindrical shaft portion 76 surrounded by a thrust disk 78 fast to the shaft portion 76 as by the key and keyway indicated at 79. The thrust disk 78 is maintained in fixed axial position with respect to shaft 15 by an annular spacer or ring 80 interposed between the shaft shoulder 75 and one side of the disk 78 and a nut 81 engaging the other side of the disk and screwed onto a threaded portion 82 provided on the shaft 15. Thus, the thrust disk 78 is clamped between the members 80 and 81 and all of these members rotate with the shaft 15. A thrust shoe 83 carried by a base ring 84 is arranged on each side of the thrust disk 78. The thrust shoes 83 are stationary and are suitably supported. Thus, the inner shoe carrier ring 84 engages an outwardly facing radial shoulder 85 formed on the bearing housing 22 which is suitably recessed to embrace the inner shoe 83 and base ring 84. The other or outer shoe carrier or base ring 84 is backed up by a shoulder 86 formed on a thrust bearing housing 88 which is recessed to embracingly receive the outer shoe 83 and base ring 84. The outer end face 89 of the housing 88 engages the inner end of the thrust sensing element 64. The outer end face of the sensing element 64 is engaged and backed up by the axially facing inner end surface 90 formed on an end cap 91. The end cap is secured as by screws 92 to a tubular thrust element housing member 93 which is secured to the bearing housing 22 by screws 94. This member 93 houses a substantial part of the thrust sensing element 64 and also houses the thrust bearing housing 88. The thrust bearing 74 and thrust sensing element 64 are further covered by a removable cup-shaped cover 95 secured to the end head 12 as by the screws 96.

The by-pass passage 49 is controlled by a valve 98. The position of the valve 98 controls the extent of communication between the chambers 43 and 48. While any suitable means for controlling the position of the valve 98 with respect to a seat 99 therefor formed on the diaphragm 36 may be provided, the means shown comprise arranging the valve 98 as a head on one end of a stem 100. This stem is suitably mounted for sliding movement on the turbine diaphragm 45 and extends axially through a hole provided therein. The end of the stem 100 remote from the valve head 98 is externally threaded and engaged by a nut 101. The valve stem 100 is held against rotation in any suitable manner as by a key 102 projecting into an axially extending slot provided in the stem 100. The nut 101 is held against axial movement relative to the end head 11 and is provided with external gear teeth which mesh with a pinion 103 fast to one end of a control shaft 104. The shaft 104 is arranged parallel and eccentric to the valve stem 100 and is suitably journalled on the end head 11. The outer end of the shaft 104 is shown as being adapted to accommodate a tool or crank (not shown) whereby this shaft can be rotated the desired amount so as to cause axial displacement of the valve stem 100 and hence movement of the valve head 98 away from or toward the valve seat 99.

*Operation*

Let it be assumed that air is being handled by the compressor. The supply of air, say at a pressure of 2500 p.s.i., is suitably connected to the compressor inlet 42. The shaft 15 is rotated at the desired speed. Air entering the inlet 42 passes successively through the various impellers 24—28 so as to be compressed thereby. The air leaving the final impeller 28 is at a high pressure, say 5000 p.s.i. This comparatively higher compressed air may be discharged through the compressor outlet 44 to a process or utilized for the purpose desired.

The compressor is designed so that varying portions, say as high as 50 percent of the compressed air produced by the various stage impellers, is utilized to drive the power recovery turbine wheel 29. An excess of capacity is deliberately provided so that better hydraulic efficiency is obtained and surging or pumping of the compressor is avoided under light loads.

The amount of normal compressor discharge developed and bled off through the by-pass passages 49 for driving the power recovery turbine wheel 29 is controlled by the setting of valve 98. Obviously, the closer this valve 98 is to its seat 99 the smaller the percentage of the developed output of the compressor is utilized for driving the turbine wheel 29. Such a condition would obtain when the load demand on the compressor is high. On the other hand, when compressor demand is low, the valve 98 is moved further away from its seat 99 so as to allow a greater portion of the compressed air developed by the compressor to be bled off for driving the turbine wheel 29. It is apparent that utilizing the compressed fluid to drive the turbine wheel 29 is a way of recovering power since the turbine wheel drives the shaft 15.

The by-pass valve 98 is preferably never completely closed by engaging its seat 99. This is so that the tendency of the compressor to pump or surge is minimized and a certain amount of cooling of the turbine wheel is, therefore, effected at all times.

As previously described, the arrangement of the impellers 24—28 and the turbine wheel 29 produces a resultant end thrust on the shaft 15. The amount of this resultant end thrust will vary in magnitude but will always be effective in an axial direction from right to left as viewed in the figures or toward the suction end of the compressor. In other words the axial thrust of the turbine wheel 29 does not fully overcome the axial thrust of the impellers 24—28. This residual or resultant end thrust is counterbalanced by the operation of the thrust balance piston 56. The pressure within balancing chamber 61 and effective against the inside piston end face 62 can vary in magnitude but never exceeds the pressure effective against the outside piston end face 63. Thus the pressure acting against the piston end face 63 is effective to urge the shaft 15 to which the piston is axially fixed from left to right as viewed in the figures or toward the discharge end of the compressor. By controlling the pressure in the chamber 61, the axial thrust compensating force on the shaft 15 produced by the thrust balance piston 56 can be adjusted and in such manner that the compensating piston induced thrust will counterbalance the oppositely acting resultant thrust produced by the impellers and turbine wheel.

The end thrust of the shaft 15 in either axial direction is absorbed by the thrust bearing 74. However, the tendency of the resultant thrust developed by the impellers and turbine wheel is always toward the thrust sensing element 64. As this resultant end thrust tends to compress the liquid such as mercury within the sensing element 64, it displaces fluid into and through the line 65 so as to actuate the indicating and controlling instrument 66. This instrument 66 in turn controls the ingress or egress to the upper compartment above the diaphragm of the control valve 68.

Assuming that an increase of pressure in the liquid of the sensing element 64 causes a control fluid such as compressed air to flow through the line 69 toward the upper compartment of the diaphragm operated control valve 68, this will cause this valve to open and allow pressure within the balancing chamber 61 to bleed off and thereby be relieved. This bled-off air can be exhausted to atmosphere or otherwise as desired. The effect of reducing the pressure in balancing chamber 61 is to increase the pressure differential on the opposite axially facing sides 62 and 63 of the piston 56. Thus, if the pressure against outer end face 63 on the piston remains the same but the pressure acting upon the inner end face 62 decreases due to pressure relief of chamber 61 in the manner just described, the pressure acting upon end face 63 will be effective to place a greater compensating thrust force upon shaft 15. This compensating force acts from left to right as viewed in the figures or away from the thrust sensing element 64 thereby relieving the compressive load thereon. As this thrust sensing element 64 is so relieved, the displacement of its internal liquid and the pressure thereof in the lines 65 is reduced, permitting instrument 66 to permit a flow of fluid through the control line 69 from the diaphragm compartment of the valve 68 toward the instrument 66. This operates to shut the control valve 68. Closing of the valve 68 allows the pressure within the balancing chamber 61 to build up again. Such build up is caused by leakage of air past the labyrinth seals 59 and 60. As the fluid pressure within chamber 61 builds up the compensating thrust force developed by thrust balance piston 56 decreases.

In this manner the compensating thrust force developed by the thrust balance piston 56 is automatically controlled not only for a given load on the compressor but also under conditions of a varying load on the compressor.

From the foregoing, it will be seen that the form of the invention illustrated provides power recovery, prevents surging, reduces the pressure and temperature on the shaft seals, and provides shaft end thrust control, and generally achieves the objects stated. Inasmuch as changes and modifications to the embodiment shown and described will occur to those skilled in the art, the same is illustrative and not limitative of the invention which is to be determined by the scope of the appended claims.

What is claimed is:

1. In a centrifugal compressor, the combination comprising a casing having end heads, a shaft journalled in bearings on said end heads, a seal assembly surrounding said shaft and arranged inwardly of the journal bearing at each end thereof, a plurality of impellers fast to said shaft and arranged between said seal assemblies to provide multi-stage compression, a power-recovery radially inward flow type turbine wheel fast to said shaft and arranged between the last stage impeller and the corresponding seal assembly and means for by-passing to said wheel some of the compressed fluid discharged by said last stage impeller to be expanded while flowing through said wheel and thereby drive the same, the expanded fluid discharged by said wheel being directed toward said corresponding seal assembly.

2. In a centrifugal compressor, the combination comprising a casing having end heads, a shaft journalled in bearings on said end heads, a seal assembly surrounding said shaft and arranged inwardly of the journal bearing at each end thereof, a plurality of impellers fast to said shaft and arranged between said seal assemblies to provide multi-stage compression, a power-recovery radially inward flow type turbine wheel fast to said shaft and arranged between the last stage impeller and the corresponding seal assembly, means for by-passing to said wheel some of the compressed fluid discharged by said last stage impeller to be expanded while flowing through said wheel and thereby drive the same, the expanded fluid discharged by said wheel being directed toward said corresponding seal assembly, and means for balancing thrust exerted on said shaft by said impellers and wheel.

3. In a centrifugal compressor, the combination comprising a casing having end heads, a shaft journalled in bearings on said end heads, a seal assembly surrounding said shaft and arranged inwardly of the journal bearing at each end thereof, a plurality of impellers fast to said shaft and arranged between said seal assemblies to provide multi-stage compression, the first stage impeller having an inlet, a power-recovery radially inward flow type turbine wheel fast to said shaft and arranged between the last stage impeller and the corresponding seal assembly, means for by-passing to said wheel some of the compressed fluid discharged by said last stage impeller to be expanded while flowing through said wheel and thereby drive the same, the expanded fluid discharged by said wheel being directed toward said corresponding seal assembly, and means for conducting said expanded fluid to said inlet.

4. In a centrifugal compressor, the combination comprising a vertically split one-piece barrel type outer casing, end heads for said outer casing at least one of which is removably attached thereto, a shaft journalled on said end heads, a plurality of impellers arranged end to end on said shaft and fast thereto to provide multi-stage compression, each of said impellers having an inlet and outlet, a power recovery turbine wheel fast to said shaft and arranged thereon back-to-back with the last stage impeller, said turbine wheel having an inlet, an inner case arranged within said outer casing and surrounding said impellers and wheel and including means establishing communication between the inlets and outlets for said impellers of successive stages and also including passage means providing a by-pass between the outlet of said last stage impeller and inlet for said turbine wheel, valve means for controlling said by-pass, and means for balancing thrust exerted on said shaft by said impellers and wheel.

5. In a centrifugal compressor, the combination comprising a casing, a shaft journalled on said casing, a plurality of impellers arranged end to end on said shaft and fast thereto to provide multi-stage compression, a power recovery turbine wheel fast to said shaft and arranged thereon adjacent the last stage impeller so that the thrust exerted on said shaft by said wheel is opposite to that exerted by said impellers, and means for balancing shaft thrust and including spaced stationary wall means providing a recess therebetween and arranged between said wheel and said last stage impeller, an annular piston surrounding said shaft and fast thereto and closing said recess to provide a balancing chmber which collects fluid leaking past the joints between stationary and movable elements defining said chamber, one axially facing side of said piston being subjected to impeller pressure and the other side to the pressure of fluid in said chamber, an element for sensing the end thrust of said shaft, a controlled pressure relief valve for said chamber and means for controlling said relief valve in response to end thrust sensed by said sensing element.

6. In a centrifugal compressor, the combination comprising a casing, a shaft journalled on said casing, a plurality of impellers arranged end to end on said shaft and fast thereto to provide multi-stage compression, a power recovery turbine wheel fast to said shaft and arranged thereon adjacent the last stage impeller so that the thrust exerted on said shaft by said wheel is opposite to that exerted by said impellers, and means for balancing shaft thrust and including spaced stationary wall means providing a recess therebetween and arranged between said wheel and said last stage impeller, an annular piston surrounding said shaft and fast thereto and closing said recess to provide a balancing chamber which collects fluid leaking past the joints between stationary and movable elements defining said chamber, one axially facing side of said piston being subjected to impeller pressure and the other side to the pressure of fluid in said chamber, an element for sensing the end thrust of said shaft, a diaphragm operated relief valve for said chamber, means for moving said diaphragm in response to end thrust sensed by said sensing element, means providing a conduit between said chamber and the inlet for the first stage impeller and a check valve arranged in said conduit to open when the pressure in said chamber rises to a predetermined level.

References Cited in the file of this patent

UNITED STATES PATENTS

| | | | |
|---|---|---|---|
| 971,850 | Krogh | Oct. 4, | 1910 |
| 971,852 | Krogh | Oct. 4, | 1910 |
| 1,066,581 | Brown | July 8, | 1913 |
| 1,110,864 | Banner | Sept. 15, | 1914 |
| 1,146,078 | Krogh | July 13, | 1915 |
| 2,283,131 | Shaw et al. | May 12, | 1942 |
| 2,444,659 | Lundquist | July 6, | 1948 |
| 2,518,815 | Polk | Aug. 15, | 1950 |